United States Patent Office 3,225,949
Patented Dec. 28, 1965

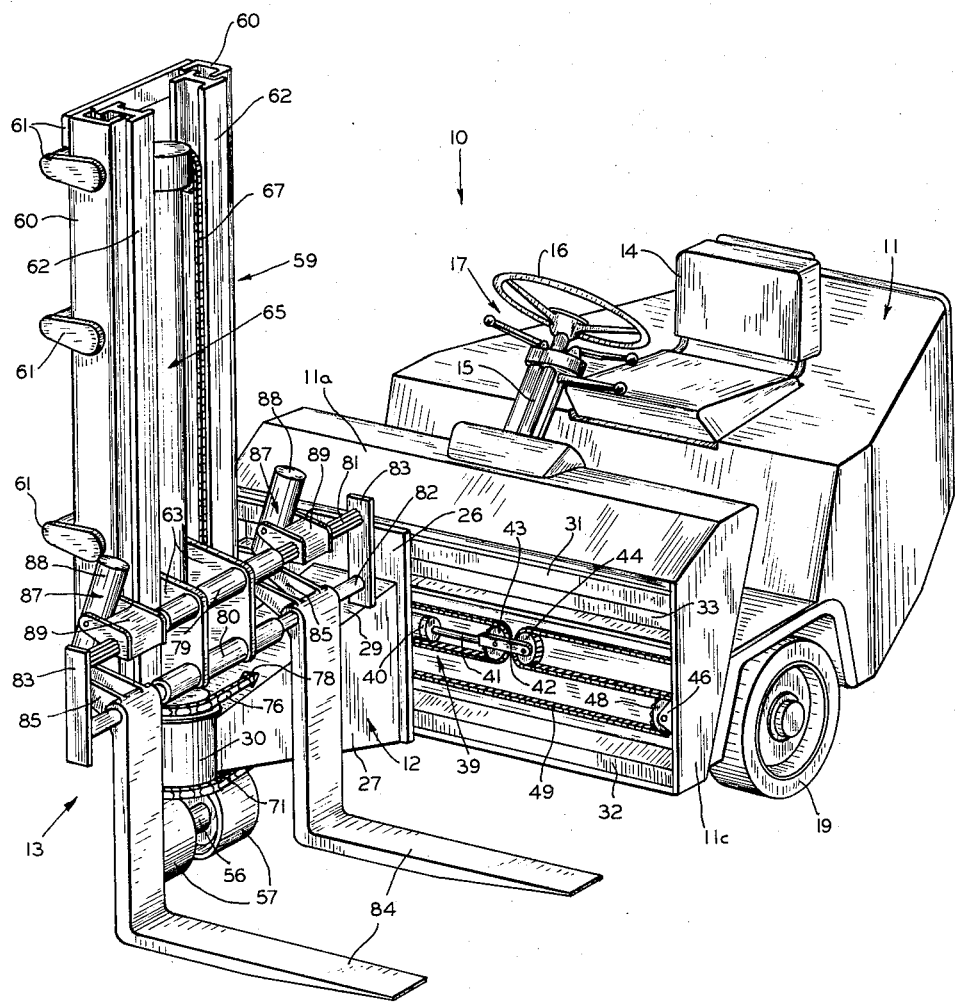

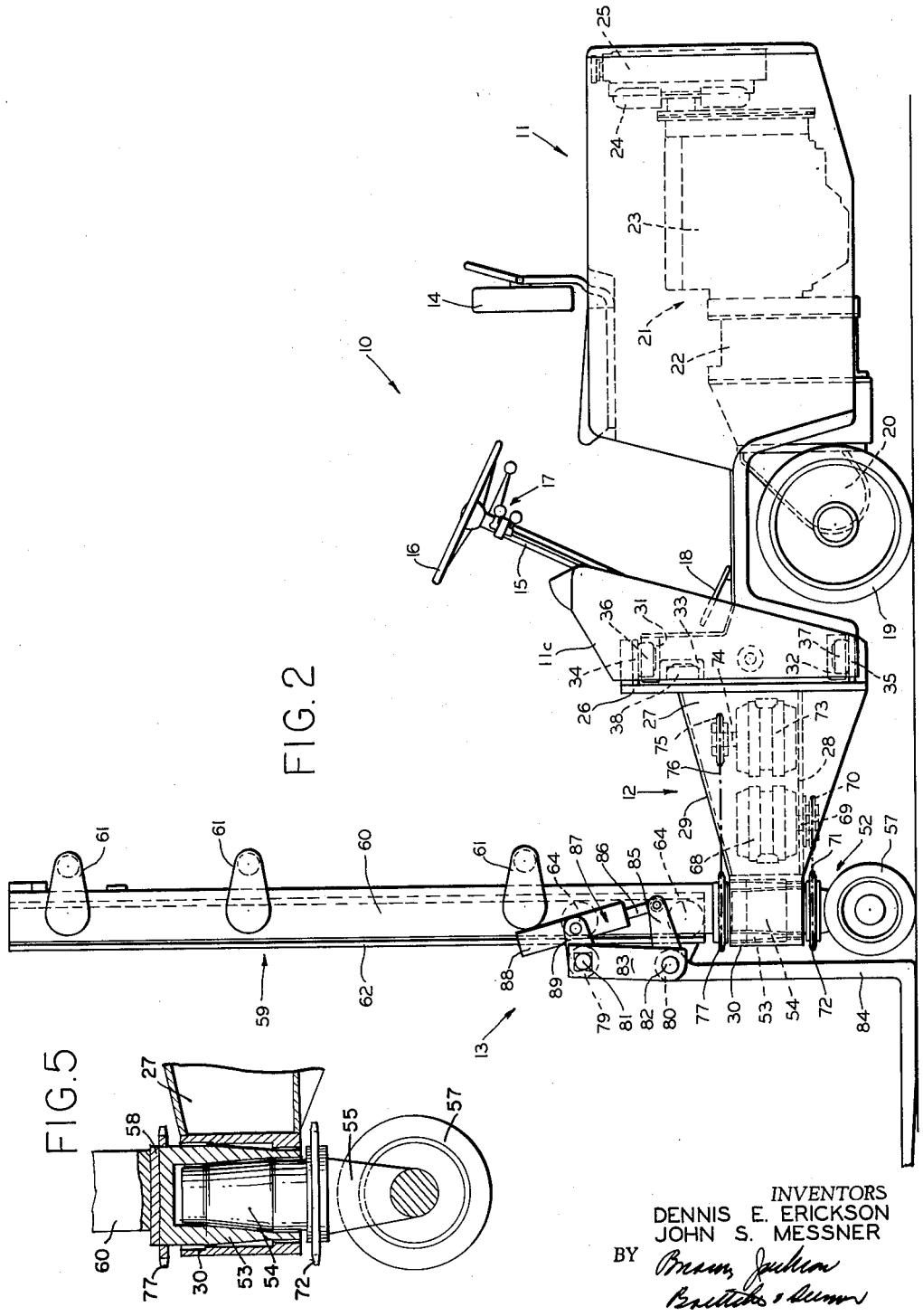

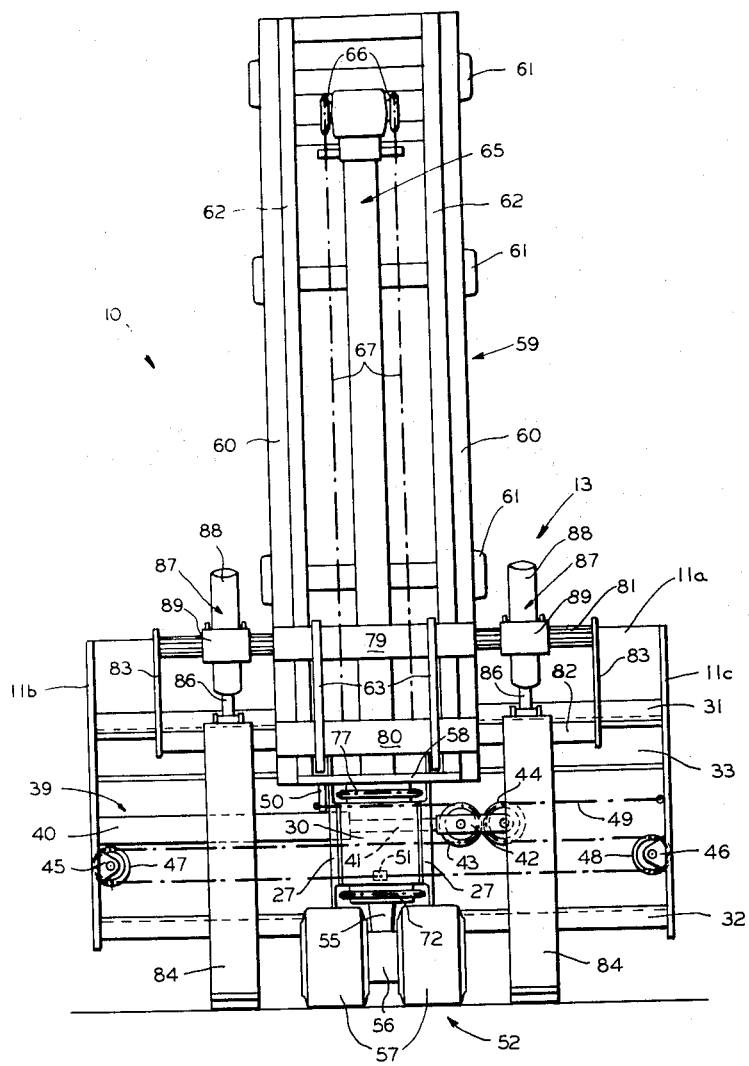

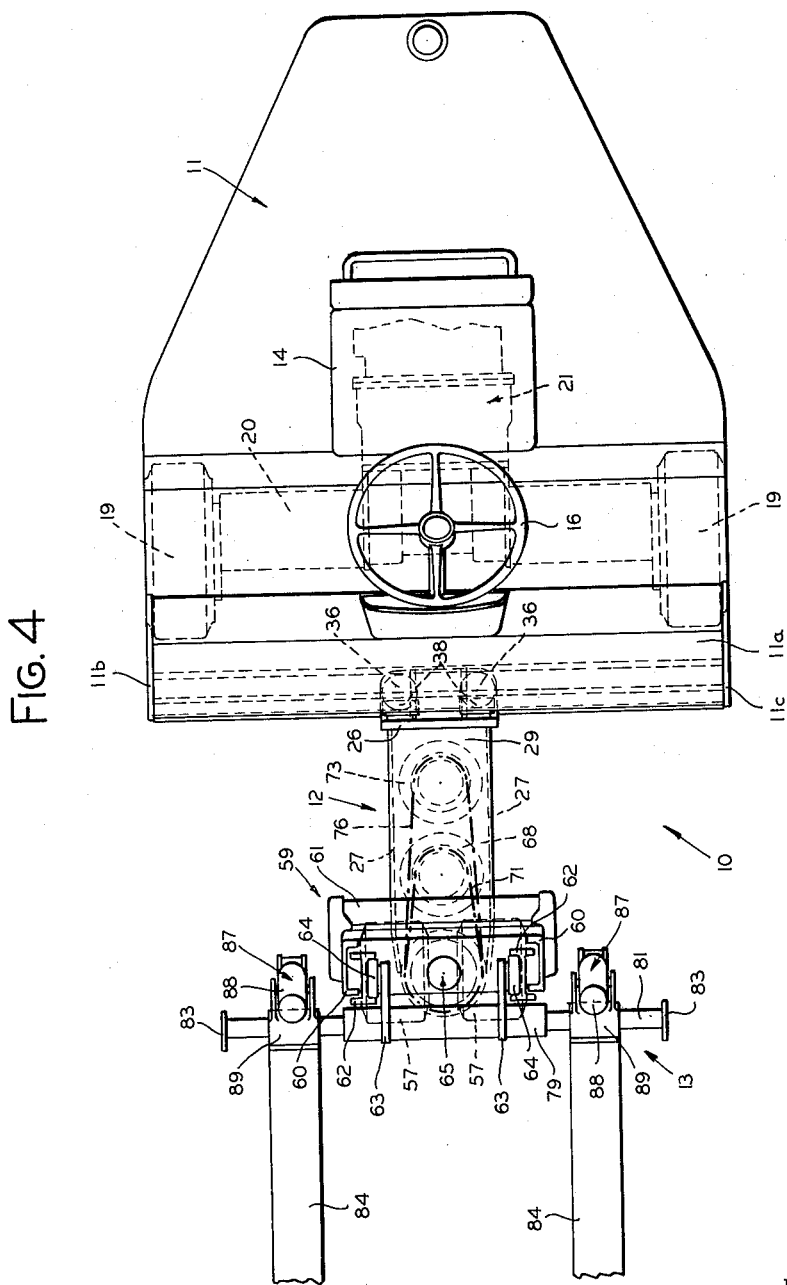

1

3,225,949
LIFT TRUCK WITH LOAD HANDLING ASSEMBLY MOUNTED ON A MOVABLE FRAME SUPPORTED BY THE STEERING WHEEL OF THE TRUCK
Dennis E. Erickson and John S. Messner, Battle Creek, Mich., assignors to Clark Equipment Company, a corporation of Michigan
Filed Aug. 17, 1962, Ser. No. 217,657
10 Claims. (Cl. 214—660)

Our present invention relates generally to an industrial truck and more specifically to an industrial lift truck especially adapted for engaging, transporting and depositing loads in confined areas.

Industrial lift trucks usually comprise a main frame with a telescoping mast assembly, at the forward end thereof, which includes a vertically movable load supporting carriage. For normal load handling usage, it has been conventional to secure forwardly extending load supporting forks to the load supporting carriage. In the operation of such a truck, for example, in warehouses and the like, aisles must be of sufficient width to permit the truck to turn within the aisle to face the loading and unloading spaces. Since the overall length of such lift trucks is greater than their width, aisles must be maintained wider than would be required, if the trucks did not have to turn within the aisle. In recognition of this fact, and because it is economically desirable to minimize aisle width so as to maximize the use of storage space, various expedients have been devised for enabling operation of industrial lift trucks in confined areas, such as aisles that are narrower than the overall length of the truck.

One general approach to this problem has been to mount load supporting forks on the load supporting carriage in such a manner that loads may be engaged and deposited at the side of the truck. In some arrangements, laterally extending, transversely movable, load supporting forks have been mounted on the carriage. In other arrangements, load supporting forks have been pivotally mounted on the carriage. These prior arrangements have proved to be impractical and inadequate in many load handling applications. Most previous devices have lacked flexibility because they have been capable of engaging and depositing a load at one side of the truck only. Other arrangements have reduced the load carrying capacity of the truck because they have been heavy and bulky. Moreover, in almost all such devices, due to the additional structure projecting forwardly of the truck, engaged loads are supported further from the center of gravity of the truck than they would normally be, thus increasing the tilting leverage on the truck and rendering the latter unstable.

It is an object of our present invention to provide an industrial truck that can engage and deposit loads at either side of the truck and that is not subject to the disadvantages of prior trucks described above.

It is another object of our present invention to provide an industrial truck comprising a main frame and load engaging means, preferably in the form of a vertical telescoping mast assembly and load supporting means elevatable therein, wherein the load engaging means is connected with the main frame but is movable relative thereto and is supported on separate, independent ground-engaging wheel means.

It is still another object of our present invention to provide an industrial truck, as described, wherein the load engaging means is movable transversely of the main frame.

It is a further object of our present invention to provide an industrial truck, as described, wherein the load

2 engaging means is rotatable about a vertical axis through at least 180 degrees.

It is still a further object of our present invention to provide an industrial truck, as described, wherein the ground-engaging wheel means for supporting the load engaging means is rotatable independently of the latter about a vertical axis through at least 180 degrees.

In an industrial truck of the character described, the load engaging means may be rotated about a vertical axis to face a loading space at either side of the truck. The load engaging means is then moved transversely across the face of the truck until a load has been engaged. After engagement of the load, the load engaging means is withdrawn toward the center of the truck and rotated so as to extend forwardly thereof whereupon the truck may be driven to an unloading area. Here, the load engaging means may again be rotated about a vertical axis to face the unloading space at either side of the truck and moved transversely until the load is deposited at the side of the truck. After discharge of the load, withdrawal of the load engaging means toward the center of the truck and rotation of the load engaging means to a forwardly extending position, the truck is available for engaging, transporting and depositing other loads. During the operation of the truck of our present invention, the ground-engaging wheel means associated with the load engaging means serves to support the latter in all positions of load engaging, transporting and depositing, whereby maximum load carrying capacity and stability of the truck is attained. In addition, since the ground-engaging wheel means is rotatable about a vertical axis independently of the load engaging means, the wheel means serves to steer the truck when the latter is being driven from one location to another and serves to guide the load engaging means during transverse movement of the latter relative to the main frame of the truck.

To provide maximum weight-distribution balance, it is a feature of our present invention that the drive means for the truck, which is mounted on the main frame thereof, is arranged to extend rearwardly from a pair of transversely spaced ground-engaging wheels serving to support the frame.

Now in order to acquaint those skilled in the art with the manner of constructing and using industrial trucks in accordance with the principles of our present invention, we shall describe in connection with the accompanying drawings, a preferred embodiment of our invention.

In the drawings:

FIGURE 1 is a perspective view of the industrial truck of our present invention;

FIGURE 2 is a side elevational view of the truck of FIGURE 1;

FIGURE 3 is a front elevational view of the truck of FIGURE 1;

FIGURE 4 is a plan view of the truck of FIGURE 1; and

FIGURE 5 is an enlarged fragmentary view, partly in elevation and partly in section, of the steering and mast pivoting assemblies of the truck of FIGURE 1.

Referring now to the drawings, the industrial truck of our present invention is indicated generally by the reference numeral 10. The truck 10, as shown in FIGURES 2 and 4, comprises a primary or main frame 11, a secondary frame or housing 12, and load engaging means 13, preferably in the form of a vertical telescoping mast assembly and load supporting means elevatable therein.

The main frame or body portion 11 of the truck 10, which at its forward end has a transverse, integral structural casing portion 11a with vertical side walls 11b and 11c, serves to house and mount various components of the truck including an operator's seat 14, a steering column 15 with a hand steering wheel 16 at the upper end thereof, a cluster of control levers 17 on the steering column 15 immediately beneath the steering wheel 16, and an accelerator pedal 18. A pair of transversely spaced ground-engaging, drive wheels 19 are respectively mounted at the ends of transverse axle and differential means 20 disposed adjacent the forward end of the main frame 11. The drive wheels 19 are operatively connected through the axle and differential means 20 with drive means, indicated generally by the reference numeral 21, which, by way of example, comprises transmission means 22 and a diesel or gasoline engine 23. The drive means 21 is supported on the frame 11 and is arranged to extend rearwardly from the drive wheels 19. Conventional cooling means, in the form of a fan 24 and a radiator 25, is provided at the rear end of the engine 23.

The secondary frame or housing 12, which extends forwardly from the main frame 11, comprises a vertical, transverse rear plate member 26 to which are secured a pair of vertical, transversely spaced, generally parallel, side plate members 27, each having upper and lower edges converging toward each other in a forward direction in the particular embodiment of our invention disclosed herein. The housing 12 further comprises a lower horizontal support plate 28 and an upper sloping cover plate 29, both of which are secured to the rear plate 26 and the side plates 27. A vertical tube member 30 is secured to the forward ends of the side plates 27, support plate 28 and cover plate 29 for a purpose to be more fully described hereinafter. As shown in FIGURES 1 and 4, the housing 12 is of a width substantially less than the width of the frame 11 and is mounted at its rear end on the forward end of frame 11 for transverse movement thereacross.

We shall now described the means employed for mounting the rear end of the housing 12 to the forward end of the frame 11. Secured to the casing side walls 11b and 11c and extending transversely of the front end of the frame 11, as shown in FIGURE 1, are three horizontal C-shaped channel members 31, 32 and 33. The open sides of the upper and lower channel members 31 and 32 face away from each other and the open side of the intermediate channel member 33, which is located immediately below the upper channel member 31, faces forwardly. The vertical plate 26 of the housing 12 has rearwardly extending upper and lower arms 34 and 35 each of which on its inward side carries, respectively, a pair of rollers 36 and 37 rotatable about vertical axes, and the plate 26 on its rearward face carries a pair of rollers 38 rotatable about horizontal axes. The rollers 36 and 37 fit in the upper and lower channels 31 and 32, respectively, and the rollers 38 fit in the intermediate channel 33. The interengaging rollers 36, 37 and 38 and channels 31, 32 and 33 serve to guide the housing 12 as it traverses the front of the frame 11 from one side to the other and receives the horizontal and vertical components of the forces acting between the frame 11 and housing 12.

The means for effecting transverse movement of the housing 12 relative to the frame 11, as most clearly illustrated in FIGURE 3, preferably comprises a horizontal piston and cylinder assembly 39 having a cylinder 40 and a piston rod 41. The closed end of the cylinder 40 is anchored to the inboard side of the casing side wall 11b, and the outer end of the piston rod 41 has secured thereon a yoke member 42 between the arms of which are rotatably mounted, in side-by-side relationship about horizontal axes, a pair of sprockets 43 and 44. A pair of bracket members 45 and 46 are one each secured to the inboard sides of the casing walls 11b and 11c in a plane immediately below the hydraulic assembly 39. Rotatably mounted about horizontal axes in the brackets 45 and 46, respectively, are sprockets 47 and 48. A suitable force transmitting chain 49 is anchored at its one end to the inboard side of the casing wall 11c, is trained about sprockets 44, 48, 47 and 43, is anchored at its other end to a flange 50 secured to the cylinder 40, and is attached to the housing plate 26 as indicated at 51. With the described arrangement of sprockets and chain, the housing 12 will travel transversely at twice the rate of the piston rod 41, producing a full range of movement from one side of the frame 11 to the other side. Distention of the piston rod 41 causes the housing 12 to travel to the left, as viewed in FIGURE 3, while retraction of the piston rod 41 causes the housing 12 to travel to the right. Actuation of the hydraulic assembly 39 may be effected by manipulation of the appropriate control lever among the cluster 17.

Mounted at the forward end of the housing 12, as shown in FIGURE 2, is the load engaging means 13 and steering wheel means 52 which we shall now describe in detail. Journalled in the tube member 30, which has internal, inwardly tapering walls in a downward direction, is a sleeve member 53 having its walls tapering toward each in a downward direction. Journalled in the sleeve member 53 is a spindle 54 having its outer walls tapering inwardly in an upward direction. The lower end of the spindle 54, as shown in FIGURE 3, has a reduced portion 55 that is secured to the center of a horizontal stub axle 56 on the ends of which are rotatably mounted a pair of ground-engaging, steering and load supporting wheels 57.

Arranged directly above the steering wheels 57 and mounted on a base plate 58, which is secured to the upper end of the sleeve member 53, is a vertically extending telescoping mast assembly 59 of conventional construction. The mast assembly 59, as shown in FIGURES 3 and 4, comprises a pair of transversely spaced outer channel members 60 reinforced by vertically spaced transverse braces 61, a pair of inner movable channel members 62, a load supporting carriage including forwardly projecting arms 63 and having rollers 64 guided in the inner channel members 62, and a central hydraulic piston and cylinder assembly 65 operable through sprockets 66 and chains 67 to elevate the load supporting carriage 63 within the channel members 60 and 62.

The above-described steering wheel means 52 and telescoping mast assembly 59 are adapted to be rotated independently about the vertical axis of the tube member 30 through at least 180 degrees. As shown in FIGURE 2, rotation of the steering wheel means 52 may be effected, for example, by means of a torque motor 68 mounted on the horizontal support plate 28 of the housing 12 adjacent the forward end thereof. The drive shaft 69 of the motor 68 extends downwardly through an opening in the plate 28 and has secured thereon a sprocket 70 which is drivingly connected through a chain 71 with a sprocket 72 secured to the spindle 54 immediately below the tube member 30. The motor 68 is adapted to be actuated by the hand steering wheel 16 acting through conventional hydraulic linkage means (not shown). Rotation of the mast assembly 59 may be effected in a similar manner by means of a torque motor 73 mounted on the support plate 28 rearwardly of the motor 68. Secured on the end of the upwardly extending drive shaft 74 of the motor 73 is a sprocket 75 which is drivingly connected through a chain 76 with a sprocket 77 secured to the sleeve member 53 immediately above the tube member 30. A pair of openings 78, one of which is shown in FIGURE 1, are provided in the housing cover plate 29 to permit the chain 76 to pass therethrough. Actuation of the motor 73, by means of a conventional valve (not shown), for effecting selective independent rotation of the mast assembly 59 may be accomplished by manipulation of the appropriate control lever among the cluster 17.

Referring now to FIGURES 2 and 3, the mounting of load supporting forks on the load supporting carriage 63 will be described. Extending through and secured in the load supporting carriage plates 63 are a pair of vertically spaced, horizontal sleeve members 79 and 80 which, respectively, provide support for a splined rod 81 and a shaft 82. The ends of the rod 81 and shaft 82, which project laterally beyond the ends of the sleeves 79 and 80, have secured thereto end plates 83. Journalled on the shaft 82 on opposite sides of the sleeve 80 are the upper ends of the vertical legs of a pair of L-shaped load supporting forks 84. Projecting rearwardly from the upper ends of the vertical legs of the forks 84 are integral levers 85 which at their free ends are pivotally connected to the piston rods 86 of hydraulic piston and cylinder assemblies 87. The cylinders 88 of the hydraulic assemblies 87 are, in turn, pivotally mounted intermediate of their ends in the free ends of rearwardly extending brackets 89 keyed to the splined rod 81 at opposite sides of the sleeve 79. Tilting of the forks 84 about the shaft 82 is adapted to be effected through actuation of the hydraulic assemblies 87 and corresponding distention or retraction of the piston rods 86. Also, each bracket 89 and associated fork 84 may be manually moved along the rod 81 and shaft 82, within the limits of the distance between the ends of sleeves 79 and 80 and the adjacent end plate 83, to adjust the lateral spacing between the forks 84. It will be understood that the rod 81 need not necessarily be splined. All that is required is that the connection between the rod 81 and brackets 89 be such that the latter are non-rotatably but slidably mounted on the rod 81.

We shall now describe a typical use of the industrial truck of our invention in engaging and depositing loads at the side of a narrow aisle. With the steering wheel means 52 and the telescoping mast assembly 59 in their normal positions shown in FIGURES 2, 3 and 4, the truck 10 may be driven down the aisle and stopped adjacent to the load to be engaged. While the truck 10 is being driven from one location to another it will be understood that the steering wheel means 52 may be rotated for steering the truck by actuation of the torque motor 68 through manipulation of the hand steering wheel 16. After the truck 10 has been suitably positioned in the aisle, and assuming that the load to be engaged is at the right side of the truck as viewed in FIGURE 1, the torque motor 73 is actuated to effect rotation of the mast assembly 59 through 90 degrees from the forward facing position shown in FIGURES 2, 3 and 4 to the sideward load facing position shown in FIGURE 1. Thereafter, the steering wheel means 52 is rotated through 90 degrees to the position shown in FIGURE 1, the load supporting carriage 63 is elevated within the mast 59 to position the forks 84 at the necessary load engaging height, and the housing 12, the mast 59 and the forks 84, through actuation of the hydraulic assembly 39, are shifted laterally to the right to take on the load. Then, through reverse actuation of the hydraulic assembly 39, the housing 12, the mast 59, the forks 84 and the engaged load are shifted laterally to the left toward the position shown in FIGURE 1 until the load is withdrawn into the aisle. At this time, the mast assembly 59 and steering wheel means 52 are rotated to their forwardly facing position and the truck 10 is ready to transport the load down one or more aisles to the place of unloading.

In depositing a load at the side of an aisle, the same procedure, which is outlined above in connection with engaging a load, is followed. If the load is to be deposited at the right side of the truck as viewed in FIGURE 1, the mast assembly 59 and steering wheel means 52 are rotated to face the right, the load supporting carriage 63 is vertically adjusted to position the load at the proper height, the housing 12 and mast 59 are shifted to the right to deposit the load on the selected horizontal load supporting surface, the housing 12 and mast 59 are then drawn back in front of the truck, and finally the mast 59 and steering wheel means 52 are returned to their forwardly facing position.

If it had been desired to engage or deposit a load on the opposite side of the aisle, that is, at the left side of the truck as viewed in FIGURE 1, the mast assembly 59 and steering wheel means 52 would have been rotated to face that other side, and the housing 12 and mast 59 would have been shifted laterally to the left to engage or deposit the load.

From the foregoing description, it will be seen that we have provided an industrial truck that can engage and deposit loads at either side of the truck. Since the entire truck need not be turned crosswise in an aisle to engage or deposit a load at the side of the aisle, narrower aisles may be employed. Additionally, since the steering wheel means 52 is located immediately below the mast assembly 59 irrespective of the position of the latter, maximum load carrying capacity and stability of the truck is attained. Still further, by arranging the steering wheel means 52 to rotate independently of the mast 59, the former may be used both to steer the truck when being driven from one location to another and to guide the mast 59 during transverse movement of the latter relative to the main frame 11 of the truck. To provide maximum weight-distribution balance, it will be observed that the drive means 21 has been arranged to extend rearwardly from the drive wheels 19 that serve to support the main frame 11.

It is to be further noted that our truck may engage and deposit loads forwardly of the truck in the usual manner. In such circumstances, the mast 59 may be shifted laterally to accurately position the forks and load. Finally, when engaging and depositing loads at the sides or the front of the truck, the forks 84 may be tilted, if necessary or desirable, through actuation of the hydraulic assemblies 87.

While we have shown and described what we believe to be a preferred embodiment of our present invention, it will be understood by those skilled in the art that various modifications and rearrangements may be made therein without departing from the spirit and scope of our invention.

We claim:

1. An industrial truck comprising primary frame means, secondary frame means mounted on and movable transversely of said primary frame means along a linear path, ground-engaging wheels means for supporting said primary frame means, ground-engaging steering wheel means mounted on said secondary frame means for supporting said secondary frame means, said steering wheel means being rotatable about a vertical axis through at least 180 degrees, and load supporting and elevating means mounted on said secondary frame means and being rotatable independently of said steering wheel means about a vertical axis through at least 180 degrees.

2. The industrial truck of claim 1 wherein said vertical axis of said steering wheel means coincides with said vertical axis of said load supporting and elevating means.

3. An industrial truck comprising primary frame means, secondary frame means mounted on and movable transversely of said primary frame means, wheel means for supporting said primary frame means, steering wheel means mounted on said secondary frame means for supporting said secondary frame means, means for rotating said steering wheel means about a vertical axis through at least 180 degrees, load supporting and elevating means mounted on said secondary frame means, and means for rotating said load supporting and elevating means about a vertical axis through at least 180 degrees independently of said steering wheel means.

4. An industrial truck comprising primary frame means having a forward end, forwardly extending secondary frame means at its rear end being mounted on the forward end of said primary frame means and being movable transversely from one side of said primary frame means to the other side along a rectilinear path, a pair of transversely spaced ground-engaging drive wheels adjacent the forward end of said primary frame means for supporting the latter, drive means operatively connected with said pair of wheels, said drive means being mounted on said primary frame means and extending rearwardly from said pair of wheels, ground-engaging steering wheel means at the forward end of said secondary frame means for supporting the latter, said steering wheel means being rotatable about a vertical axis through at least 180 degrees, said steering wheel means serving to steer the truck when said drive wheels are rotated and serving to guide said secondary frame means during transverse movement of the latter relatively to said primary frame means, and load engaging means mounted on the forward end of said secondary frame means and being rotatable about a vertical axis through at least 180 degrees.

5. An industrial truck comprising main frame means having a forward end, forwardly extending housing means at its rear end being mounted on the forward end of said main frame means and being movable transversely from one side of said main frame means to the other side, ground-engaging wheel means for supporting said main frame means, a vertical tube member at the forward end of said housing means, a vertical sleeve member journalled in said tube member, a vertical spindle journalled in said sleeve member, ground-engaging steering wheel means mounted on the lower end of said spindle for supporting said housing means, means carried by said housing means for selectively effecting rotation of said spindle and said steering wheel means about a vertical axis through at least 180 degrees, a vertical telescoping mast assembly mounted on the upper end of said sleeve member, load engaging means carried by said mast assembly, and means carried by said housing means for selectively effecting rotation of said sleeve member and said mast assembly about a vertical axis through at least 180 degrees.

6. An industrial truck comprising main frame means having a forward end, transverse channel members on the forward end of said main frame means, forwardly extending housing means, roller means mounted on the rear end of said housing means and having rolling engagement with said channel members whereby said housing means is mounted on said main frame means and may be moved transversely across the forward end of said main frame means, means associated with said main frame means and said housing means for selectively effecting transverse movement of the latter, first ground-engaging wheel means for supporting said main frame means, second ground-engaging steering wheel means for supporting said housing means, means for rotating said second ground-engaging wheel means about a vertical axis through at least 180 degrees, load engaging means mounted on said housing means, and means for rotating said load engaging means about a vertical axis through at least 180 degrees.

7. An industrial truck comprising main frame means having a forward end, forwardly extending housing means having a width substantially less than the width of said main frame means, transverse channel members on the forward end of said main frame means, roller means mounted on the rear end of said housing means and having rolling engagement with said channel members whereby said housing means is mounted on said main frame means and may be moved transversely from one side of said main frame means to the other side, means associated with said main frame means and said housing means for selectively effecting transverse movement of the latter, a pair of transversely spaced ground-engaging wheels adjacent the forward end of said main frame means for supporting the latter, drive means operatively connected with said pair of wheels, said drive means being mounted on said main frame means and extending rearwardly from said pair of wheels, a vertical tube member at the forward end of said housing means, a vertical sleeve member journalled in said tube member, a vertical spindle journalled in said sleeve member, ground-engaging steering wheel means mounted on the lower end of said spindle for supporting said housing means, means carried by said housing means for selectively effecting rotation of said spindle and said steering wheel means about a vertical axis through at least 180 degrees, a vertical telescoping mast assembly mounted on the upper end of said sleeve member, load engaging means carried by said mast assembly, and means carried by said housing means for selectively effecting rotation of said sleeve member and said mast assembly about a vertical axis through at least 180 degrees.

8. An industrial truck comprising frame means, a vertical telescoping mast assembly having connection with said frame means, a load supporting carriage vertically movable in said mast assembly, horizontal shaft means carried by said carriage, horizontal rod means carried by said carriage above said shaft means, at least two load supporting forks journalled at their upper ends on said shaft means, a lever extending rearwardly from each of said load supporting forks adjacent the upper end thereof, at least two brackets laterally slidable on said rod means and extending rearwardly therefrom, at least two power actuated means one each pivotally connected to one of said levers and one of said brackets, said power actuated means being operable to pivot said forks about the axis of said shaft means, and said forks and associated levers, brackets and power actuated means being laterally movable to adjust the spacing between said forks.

9. An industrial truck comprising frame means, a vertical telescoping mast assembly having connection with said frame means and being movable transversely thereof, first ground-engaging wheel means for supporting said frame means, second ground-engaging wheel means for supporting said mast assembly, a load supporting carriage vertically movable in said mast assembly, horizontal shaft means carried by said carriage, horizontal rod means carried by said carriage above said shaft means, at least two L-shaped load supporting forks journaled at their upper ends on said shaft means, a lever extending rearwardly from the upper ends of each of said load supporting forks, at least two brackets laterally slidable on said rod means and extending rearwardly therefrom, at least two hydraulic piston and cylinder assemblies one each pivotally connected to one of said levers and one of said brackets, said hydraulic piston and cylinder assemblies being operable to pivot said forks about the axis of said shaft means, and said forks and associated levers, brackets and hydraulic assemblies being laterally movable to adjust the spacing between said forks.

10. The industrial truck of claim 9 wherein said mast assembly is rotatable about a vertical axis through at least 180 degrees, said second ground-engaging wheel means is rotatable about a vertical axis through at least 180 degrees, and said vertical axis of rotation of said second ground-engaging wheel means coincides with said vertical axis of rotation of said mast assembly.

References Cited by the Examiner

UNITED STATES PATENTS

| | | | |
|---|---|---|---|
| 1,433,257 | 10/1922 | Brooks | 180—27 |
| 1,952,730 | 3/1934 | Remde | 214—671 |
| 2,284,237 | 5/1942 | Stevenson | 214—671 |
| 2,427,301 | 9/1947 | Puim. | |
| 2,598,865 | 6/1952 | Turner | 214—731 |
| 2,618,396 | 11/1952 | Belt | 214—671 |
| 2,738,087 | 3/1956 | Arnot | 214—701 |
| 2,748,966 | 6/1956 | Gohrke | 214—731 |
| 2,753,066 | 7/1956 | Arnot | 214—671 |
| 2,756,949 | 7/1956 | Smith | 180—79.2 |
| 2,851,182 | 9/1958 | Gehring | 214—730 |
| 2,904,203 | 9/1959 | Mindrum | 214—731 |
| 2,980,269 | 4/1961 | Zimmerman | 214—671 |
| 2,986,295 | 5/1961 | Shaffer | 214—730 |
| 2,997,193 | 8/1961 | Dunham | 214—660 X |

FOREIGN PATENTS

| | | |
|---|---|---|
| 1,247,122 | 10/1960 | France. |
| 124,083 | 4/1959 | U.S.S.R. |

GERALD M. FORLENZA, *Primary Examiner.*

MORRIS TELIN, HUGO O. SCHULZ, *Examiners.*